United States Patent [19]
Caplan

[11] 4,000,378
[45] Dec. 28, 1976

[54] DATA COMMUNICATION SYSTEM HAVING A LARGE NUMBER OF TERMINALS

[75] Inventor: Lee N. Caplan, Chester Springs, Pa.

[73] Assignee: Burroughs Corporation, Detroit, Mich.

[22] Filed: May 6, 1975

[21] Appl. No.: 575,039

Related U.S. Application Data

[63] Continuation-in-part of Ser. No. 439,313, Feb. 4, 1974, abandoned.

[52] U.S. Cl. .................................. 179/15 AL
[51] Int. Cl.² .................................. H04J 6/00
[58] Field of Search .............. 179/15 AL, 15 BA; 340/172.5

[56] References Cited
UNITED STATES PATENTS

| | | | |
|---|---|---|---|
| 3,600,519 | 8/1971 | McNeilly | 179/15 AL |
| 3,632,881 | 1/1972 | Graham | 179/15 AL |
| 3,652,993 | 3/1972 | Bradwell | 179/15 AL X |
| 3,659,271 | 4/1972 | Collins | 179/15 AL X |
| 3,680,056 | 7/1972 | Kropfl | 179/15 AL X |
| 3,755,786 | 8/1973 | Dixon | 179/15 Al X |

Primary Examiner—David L. Stewart
Attorney, Agent, or Firm—K. R. Peterson; E. J. Feeney, Jr.; E. M. Chung

[57] ABSTRACT

A large number of terminals are connected to a central computer in a loop utilizing a very high speed transmission medium. A sequential stream of message blocks are provided for transmission by the loop. Each message block includes a first portion specifying a terminal address, and a second portion for specifying information data. Each terminal interrogates the address portion of each message block and responds to its own address by either reading the data portion of the message block or loading into the data portion messages to be transmitted. By generating a continuous stream of message blocks, one for each terminal, and using a randomizing scheme for address generation, it is possible to connect a large number of terminals to a data communications system while maintaining a reasonable response time.

3 Claims, 4 Drawing Figures

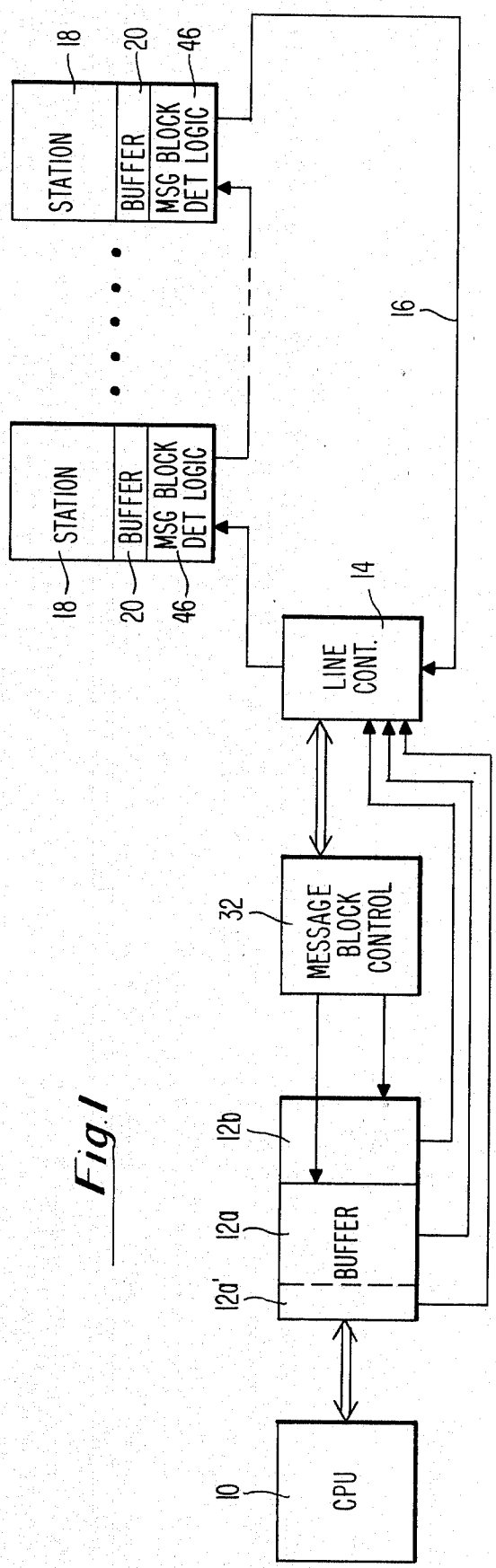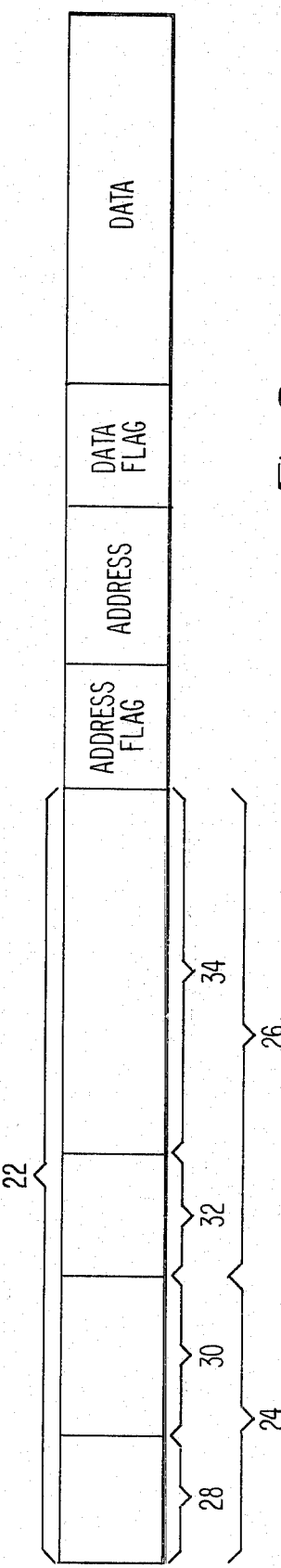

DATA COMMUNICATION SYSTEM HAVING A LARGE NUMBER OF TERMINALS

This application is a continuation-in-part of a previous application, Ser. No. 439,313, filed on Feb. 4, 1974, now abandoned, and assigned to the same assignee as the present invention.

BACKGROUND OF THE INVENTION

This invention relates to data communication systems and more particularly to methods of polling and transmitting data to a large number of terminals via a high speed transmission medium.

Communications between individuals or groups in today's world occur in a variety of ways, each of which involves a particular medium. Well-known mass communications media include radio, television, telephone, motion pictures, mail or correspondence, newspapers, and magazines. With the exception of the telephone and mail, these media are primarily one-way communication systems from which the general public may receive information, but cannot readily communicate back in the same medium. Moreover, the communications medium of mail and telephone each possess shortcomings when mass communications is desired. A variety of polling schemes are generally known in the art. In this context, polling is described as a process of addressing one of a number of remote stations or receivers connected via a common data link to a central control station by signals from the central control station. In these prior art polling systems, all of the various remote stations connected to the transmission link receive this address or polling signal, but at any given time, only one of these remote stations or receivers is designed to recognize the address or polling signal received as his own. Upon recognition, the remote station is enabled to transmit over the data link any information which it may be passing to the central control, or alternatively, receive information transmitted from the central station. In the usual polling scheme, each remote station is invited, in turn, to send inbound traffic by polling signals sent out by the central control station. A given remote station may, upon the receipt of a polling signal do, in general, one of two actions: it may begin to send any messages which it has awaiting the opportunity for transmission, or it may send back an answer code indicating that it has no traffic for transmission at that time. The central station must wait until the addressed or polled remote station responds or acknowledges the poll before a new polling signal can be initiated. During this waiting period, there can be not communications with any other terminal. If there is no priority scheme, each remote station or terminal will be polled once before any terminal will be polled again. Thus, as the number of remote stations or terminals connected to the link increase, a proportionate increase in response time will occur.

Today, however, with the increased emphasis in large scale data communications in such applications as point of sale systems, there is an increasing requirement for a large number of terminals to have access to a central data base. At the same time, it is vital that response time be at a reasonable level.

Therefore, it is a primary object of this invention to provide an improved data communications system.

Another object of this invention is to provide an improved communications system which will permit large numbers of remote terminals to be connected to a common transmission link without an appreciable increase in response time.

A further object of this invention is to provide a polling scheme for use in a data communication system having a large number of remote terminals.

A still further object of this invention is to provide a scheme for polling concurrently a large number of remote terminals connected to a common transmission link.

SUMMARY OF THE INVENTION

In the present invention, a serial communication loop is utilized to connect a plurality of remote stations with a central control. Associated with each remote terminal is a buffer for storing messages to be transmitted to the central station or alternatively, for receiving messages from the central station. Similarly, there is a buffer associated with the central station for storing all of the messages transmitted by the various remote stations and for storing the messages to be transmitted to the remote stations. A line controller is employed to generate a plurality of sequential message blocks for transmission by the serial communications loop. Each message block includes an address portion and a message portion. For any given polling cycle, the central station generates at random, an address for any given terminal. This address is incremented sequentially to provide the address information for the address portion of each message block. The line controller is adapted to retrieve information from the buffer associated with the central store at the generated addresses and inserts the information into the data portion of each message block before transmission to the serial loop. Upon return of the message block, the line controller will access the central buffer at the location specified by the address portion of the returned message block and inserts any information contained in the data portion of the message block. Upon providing an address for each terminal, a new random address is generated, and another message cycle is initiated.

BRIEF DESCRIPTION OF THE DRAWING

FIG. 1 is an overall block diagram illustrating the data communication system;

FIG. 2 is a block diagram of a message block for transmitting data in the data communication system of FIG. 1;

DETAILED DESCRIPTION OF THE INVENTION

Figure 3:
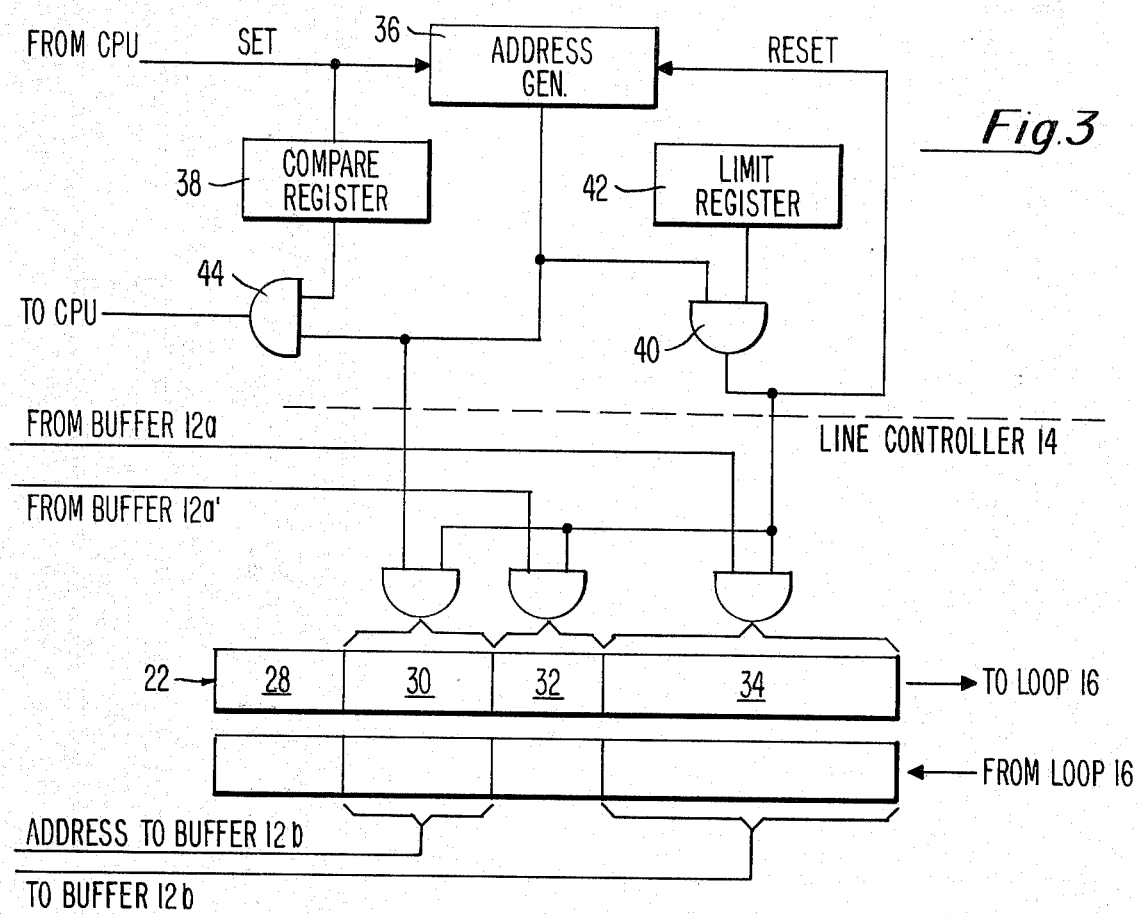
FIG. 3 is a logic block diagram of a message block control for the data communication system of FIG. 1.
Figure 4:
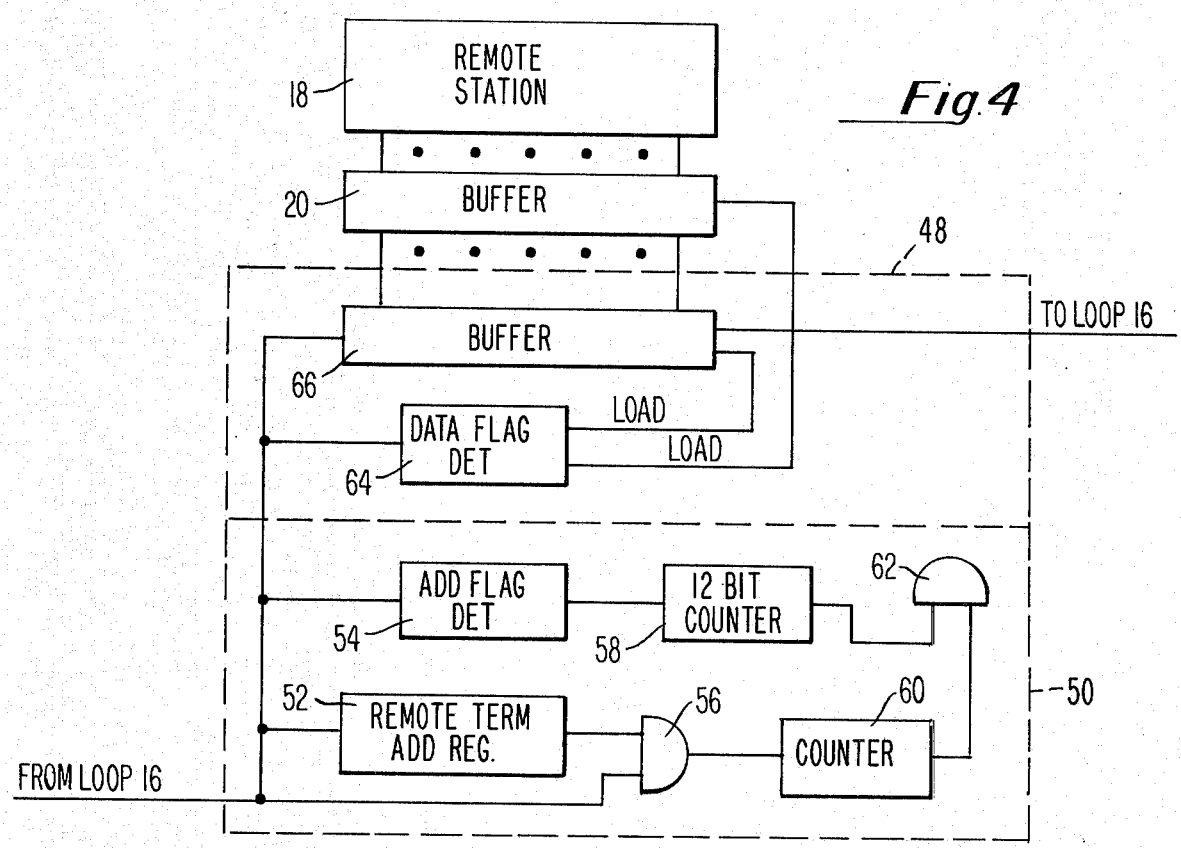
FIG. 4 is a logic block diagram of a remote station for the data communication system of FIG. 1.

A block diagram of the preferred embodiment of the invention is shown in FIG. 1. The central station 10 in the preferred embodiment of the invention is a central processing unit of a general purpose digital computer such as the Burroughs B3500 as described in the Burroughs B3500 Systems Reference Manual, Form No. 1025475. Associated with the central station 10 is a buffer 12 comprised of a transmit half 12a and a receive half 12b. Coupled to the central station 10 and the buffer 12 are a line control 14 and message block control 32, both of which together perform the function of generating message blocks for transmission by a communications line 16. As illustrated in FIG. 1, the communications line 16 is configured in a loop wherein the direction of data transmission is constant. Attached to the communications line 16 is a plurality of remote stations or terminals 18. Associated with each of these remote stations or terminals is a buffer memory 20 for storing messages to be communicated to the central station 10 or for receiving messages communicated from the central station.

Referring now to FIG. 2, there is illustrated the preferred embodiment of the message blocks, which are generated by the line controller 14. The elements, operation and functions of the line controller 14 are known in the art. In the preferred embodiment, the line controller 14 is microprogrammable. Specific examples of such line controllers are U.S. Pat. No. 3,633,164 and U.S. Pat. No. 3,668,649, both of which are assigned to assignee of the present invention. The line controller 14 is adapted via microprogramming techniques known in the art to provide a skeletonized message block 22. Each message block includes a first portion 24 for address information and a second portion 26 for data information. The address information portion 24 of a message block 22 is further divided into an eight bit flag section 28 and a twelve bit address section 30. Similarly, the data information portion 26 of a message block 22 is divided into an eight bit flag section 32 and a one hundred twenty bit data section 34.

In each skeletonized message block provided by the line controller 14, only the flag information section 28 of the address portion 24 is supplied with information by the line controller 14. Information for the address section 30 and the data information portion 26 are supplied by the message block control 32. The information for the eight bit flag section 28 represents a unique code which, when detected by the remote stations 18, is used to synchronize communications with the respective remote stations. In the preferred embodiment, each remote station or terminal 18 is preassigned an address in a sequential manner.

Referring now to the message block control 32, and its relationship to the central station 10 and the line controller 14, reference will be made to FIG. 3. Address information for the address section 30 of a message block 22 is provided from the output of an address generator 36. The address generator 36 can be embodied in any well-known hardware components and can be as simple as a cyclical binary counting device. Alternatively, the functions of the address generator can be embodied in the central station 10 by using a section of core storage for compiling lists of the address of the remote stations and arranging them in some desired order. In any event, when a message cycle (a message cycle being defined as a polling of all terminals connected to the loop 16) is initiated, the central station 10 generates at random an address for one of the remote stations 18. The randomly generated address is used to set the address generator 36 and is also loaded into a compare register 38. The address generator 36 automatically increments by one the randomly generated address supplied by the central station 10 before gating an output to the line controller 14. In addition to the line controller 14, the output of the address generator 36 is supplied as an address for the buffer 12a and as one input to an AND gate 40. The other input to the AND gate 40 is from the output of a limit register 42. The limit register 42 is preset with the highest (numerical) address of any terminal connected to the loop 16. The AND gate 40, thus performs the function of comparing the address supplied by the address generator 36 with this limit address. Upon achieving the proper comparison, the output of the AND gate 40 is employed to reset the address generator 36 to ZERO. In addition the output of the AND gate 40 is utilized as a load signal for the line controller 14. The address supplied by the address generator 36 will not be inserted into the address section 30 of the message block 22 by the line controller 14 unless the output of the AND gate 40 indicates that a proper comparison has not been achieved. Similarly, any information from the buffer storage 12a, which was accessed utilizing the address supplied by the address generator 36, will not be inserted into the data section 34 of the message block 22 unless the AND gate 40 provides the proper output signal.

To complete the message block for transmission, the flag section 32, of the data portion 26 of the message block 22 must be inserted. In the preferred embodiment, the flag section 32 of the data portion 26 is used to inform the remote stations 18 whether the message block contains information for the respective remote station or is free to accept messages for transmission from the remote station. In this connection, associated with each addressed buffer storage location of buffer 12a is an eight bit field 12a' which is set by the central station 10 when information is stored by the central station 10 at the respective location. Thus, when the output of the address generator 36 is used to access the buffer 12a, both the eight bit field 12a' and the corresponding data information at the accessed location are retrieved and supplied to the line controller 14. Upon completing the skeletonized message block for transmission, a new skeletonized message block is provided by the line controller 14. The address generator will provide as an output the next sequential address and the above-described operations will be repeated until the message cycle is complete.

To determine when a message cycle is completed, the output of the address generator 36 is also supplied as one input to a two-input AND gate 44. The other input to the AND gate 44 is from the output of the compare register 38. Since the compare register 38 contains the randomly generated address which initiated the message cycle, the address of the last message block for any given message cycle will be this randomly generated address supplied by the central station 10. Upon the determination of the completion of a message cycle, the output of the AND gate 44 will inform the central station 10 to supply a new random address to set the address generator 36 in order to begin a new message cycle. By employing this random address scheme for polling the remote stations, the poll time between any given remote station 18 and the central station 10 is at a statistical minimum.

Referring now to the actions at each of the remote stations 18 upon the receipt of a message block 22. Aside from the conventional function and operations of remote stations or terminals 18, which are examplified in U.S. Pat. No. 3,564,509 and assigned to the assignee of the present invention, each remote station 18 includes a message block detection logic 46. The message block detection logic 46 includes an address detection section 48 and a data section 50. The major elements of the address detection section 48 are a remote terminal address register 52 and an address flag detector 54. The remote terminal address register stores the specific address assigned to the respective terminal. This specific address can be entered into the remote terminal address register manually under control of the terminal, programmatically under control of the terminal, or be hardwired. The address flag detector 54 is designed to detect the unique code of the address flag field 28 common to all message blocks 22. Upon detection of the address flag field 28 of any received message block 22, a control signal is supplied to the remote terminal address register 52. Upon receipt of this control signal the contents of the remote terminal address register 52 are gated serially as one input to a two-input AND gate 56. The other input to the AND gate 56 are signals directly taken from the serial communications loop 16. The output of the AND gate 56 s provided as an input to a counter 60. The function of the counter 60 is to determine if the address specified in the remote terminal address register 52 is identical with the address specified by the address section 30 of a message block 22. If the address is identical, the output of the counter 60 is designed to be a logical ZERO. To perform this comparison, the control signal provided by address flag detector 54 initiates the twelve bit counter 58. Upon reaching a count of twelve, the counter 58 provides an output signal which is supplied as one input to a two-input AND gate 62. The other input to the AND gate 62 is from the output of the counter 60. The output of the AND gate 62 is used to provide a control signal for the data section 50 of the message block logic 46. Thus, a control signal will be provided by the AND gate 62 only if the address specified by the remote terminal address register 54 is identical with the address specified by the address section 30 of a received message block 22.

The control signal from the output of the AND gate 62 is employed to initiate a data flag detector 64, which is an element of the data section 50 of the message block detection logic 46. The other major element of the data section 50 is a buffer register 66, the function of which will be apparent from the following discussion. Upon initiation of the data flag detector 64, the data flag section 32 of a message block 22 is examined to determine the status of the flag. As previously described, the data flag section 32 will provide an indication as to whether any information is being transmitted from the central station 10 to the respective remote station 18. If the examination of the data flag section 32 reveals that information is destined for the terminal, a control signal will be provided, after a delay of 120 bit periods has occurred to the buffer memory 20 associated with each remote station 18. The 120 bit periods delay is to allow the buffer 66 sufficient time to be loaded with the entire data section 34 of the message block 22. Structurally, the communications loop 16 is provided as a serial input to the buffer 66, and the serial output of the buffer 66 is connected back to the loop 16 to maintain the continuity of the loop. Upon receipt of the control signal from the data flag detector 64, the buffer memory 20 will be parallel loaded with the contents of the buffer 66. If, on the other hand, the examination of the data flag section 32 reveals that the message block 22 is free to accept a message from the terminal 18, the data flag detector 64 will provide a control signal for the buffer 66. Again this control signal will be delayed by 120-bit periods, to allow the data section 34 of a message block 22 to be completely within the buffer 66. Upon receipt of the control signal from the data flag detector 64, the buffer 66 will be parallel loaded with the contents of the buffer memory 20 associated with each terminal. However, if the address determination section 48 of the message detection logic 46 had indicated that the received message block 22 was addressed for another terminal, no changes in the contents of the received message block 22 would be attempted, and the message block would flow through the buffer 66 without any modification.

In situations where the buffer memory 20 has been loaded with information for transmission by a terminal 18, and an examination of the data flag section 34 indicates that information is destined for the terminal, the information in the buffer memory 20 will be overwritten. Thus, the terminals 18 must be of the type known in the art, to be able to reload the associated buffer memory 20 once the transmitted or overwritten information is removed by the terminal.

Upon return of the message blocks 22 to the line controller 14, the information specified in the data section 34 is stored in the buffer memory 12b at a location specified by the address section 30 of the received message block.

While the invention has been particularly shown and described with respect to a preferred embodiment thereof, it will be understood by those skilled in the art that various changes in form and detail may be made therein without departing from the spirit and scope of the invention.

What is claimed is:

1. A method of communicating with a plurality of terminals connected in a serial loop to a central station, wherein each of said terminals has a unique address, comprising the steps of:
   randomly generating a first unique address corresponding to said unique address of one of said terminals;
   generating in the central station a sequential train of message blocks, each of said message blocks having an address portion;
   supplying said randomly generated unique address to said address portion of one of said generated message blocks;
   incrementing sequentially said first unique address to provide addresses for the respective message blocks of said sequential train following said one of said message blocks; and
   transmitting from said central station to said loop said sequential train of message blocks.

2. The method of claim 1 wherein said step of generating a plurality of message blocks additionally includes generating each of said terminal addresses starting with a new random number for each complete message cycle.

3. A system for communicating with a plurality of terminals connected in a serial loop, wherein each terminal is assigned a unique address comprising:
   first means for randomly generating a first unique address corresponding to said unique address of one of said terminals;
   second means for generating a sequential train of message blocks, each of said message blocks having an address portion; and
   third means coupled to said first means and said second means for incrementing sequentially said unique address generated by said first means to provide address information for said address portion of said generated train of message blocks.

* * * * *